United States Patent
Cole et al.

(10) Patent No.: US 9,821,920 B2
(45) Date of Patent: Nov. 21, 2017

(54) METHODS AND APPARATUS FOR COMPENSATING FOR VEHICULAR MOTION

(71) Applicant: NextVR Inc., Laguna Beach, CA (US)

(72) Inventors: David Cole, Laguna Beach, CA (US); Alan McKay Moss, Laguna Beach, CA (US)

(73) Assignee: NextVR Inc., Newport Beach, CA (US)

( * ) Notice: Subject to any disclaimer, the term of this patent is extended or adjusted under 35 U.S.C. 154(b) by 156 days.

(21) Appl. No.: 14/829,562

(22) Filed: Aug. 18, 2015

(65) Prior Publication Data

US 2017/0050743 A1 Feb. 23, 2017

(51) Int. Cl.
*B64D 43/00* (2006.01)
*G06F 3/01* (2006.01)
*G06F 1/16* (2006.01)
*G02B 27/01* (2006.01)

(52) U.S. Cl.
CPC .......... *B64D 43/00* (2013.01); *G02B 27/017* (2013.01); *G06F 1/1694* (2013.01); *G06F 3/012* (2013.01); *G02B 2027/014* (2013.01); *G02B 2027/0138* (2013.01)

(58) Field of Classification Search
CPC ... G06F 3/012; G06F 1/1694; G02B 27/0172; B64D 43/00
See application file for complete search history.

(56) References Cited

U.S. PATENT DOCUMENTS

| | | | |
|---|---|---|---|
| 2010/0182340 | A1 | 7/2010 | Bachelder et al. |
| 2012/0142415 | A1 | 6/2012 | Lindsay |
| 2015/0097864 | A1 | 4/2015 | Alaniz et al. |
| 2015/0294505 | A1* | 10/2015 | Atsmon ................ G06T 19/006 345/633 |
| 2016/0313792 | A1* | 10/2016 | Siegel .................. B60W 50/08 |
| 2016/0346704 | A1* | 12/2016 | Wagner .................. A63G 7/00 |

FOREIGN PATENT DOCUMENTS

| | | |
|---|---|---|
| RU | 2527132 C1 | 8/2014 |
| WO | 2008028877 A1 | 3/2008 |

OTHER PUBLICATIONS

Notification of Transmittal of the International Search Report and the Written Opinion of the International Searching Authority or the Declaration, International Search Report and Written Opinion of the International Searching Authority from PCT/US2016/047480 dated Oct. 27, 2016, 1-8 pages.

* cited by examiner

*Primary Examiner* — Abbas Abdulselam
(74) *Attorney, Agent, or Firm* — Straub & Straub; Michael P. Straub; Stephen T. Straub (57) ABSTRACT

A head mounted virtual reality (VR) device including an inertial measurement unit (IMU) is located in a vehicle which may be, and sometimes is, moving. Detected motion attributable to vehicle motion is filtered out based on one or more or all of: vehicle type information, information derived from sensors located in the vehicle external to the head mounted VR device, and/or captured images including a reference point or reference object within the vehicle. An image portion of a simulated VR environment is selected and presented to the user of the head mounted VR device based on the filtered motion information. Thus, the image portion presented to the user of the head mounted VR device is substantially unaffected by vehicle motion and corresponds to user induced head motion.

19 Claims, 6 Drawing Sheets

METHODS AND APPARATUS FOR COMPENSATING FOR VEHICULAR MOTION

FIELD

The present application relates to virtual reality devices and methods and, more particularly, to methods and apparatus which take into consideration detected motion as part of displaying one or more images corresponding to a virtual environment.

BACKGROUND

Virtual reality (VR) devices often rely on head mounted motion tracking devices for purposes of detecting head movement. The detected movement is then often interpreted as a change in head position within a virtual environment with the images of the virtual environment being changed to take into consideration the change in viewing position that would have resulted from the detected head movement if the user was in a real rather than a virtual environment.

Head mounted position tracking devices, such as those which may be included in a head mounted device and/or a cell phone which is part of a head mounted VR display system, tend to work well in stationary environments. For example is a user is sitting in a chair at home, the detected motion is likely to reflect head motion since the building in which the user is sitting is not likely to have significant movement.

One application for virtual reality headsets is as an entertainment device for passengers in a vehicle such as an aircraft or car. Head mounted VR devices because of their relatively compact size and ability to entertain a user for extended amounts of time are particularly well suited for use in such applications.

A problem with head mounted VR devices with motion tracking devices is that the devices will detect motion whether it is due to a user's head moving or the vehicle itself moving. When vehicle motion is detected and interpreted as movement of a user's head, the user who absent use of the VR headset has the sense of being stationary in a seat of a vehicle may be subject to a rather unsettling sense of motion in the virtual environment due to the motion that the motion tracking device in the VR headset may detect due to vehicle movement. This may cause the user to experience a sense of movement through a virtual environment despite being stationary in a seat of a car, plane or other vehicle.

In view of the above, it should be appreciated that there is a need for methods and/or apparatus which would allow a VR device to distinguish between motion that is detected due to head movement by a user of the device as opposed to movement due to motion of a vehicle in which a user is located.

SUMMARY

Various methods and apparatus are described which allow a VR device to distinguish between and/or compensate for movement, e.g., motion, of a vehicle in which a user is located and movement of a user's head or body within the vehicle. This allows for the VR device to take into consideration vehicle motion and to make changes in a virtual environment based on body, e.g., head movement of a user within a vehicle rather than based on motion of the vehicle in which a user is located.

Various techniques are used alone or in combination to reduce the effect of vehicle movement when making changes in a VR environment based on detected head movement made by a head mounted motion detection device. In some embodiments, the head mounted motion detection device is an inertial measurement unit (IMU) included in a head mounted VR device.

In accordance with one feature, motion detected by a head mounted motion detection device is filtered before making decisions on whether or not changes should be made to a VR environment or display. Sensed movement indicative of vehicle movement is filtered out and changes in detected motion after filtering is treated as movement of the user, e.g., the user's head, within the simulated environment. For example gradual increases or deceases in the angle of the users head consistent with a plane taking off or landing are filtered out from the detected motion which is acted upon in the simulated environment. Similarly motion consistent with that which would be experienced by a user in a plane making a left or right turn may be filtered out.

To facilitate appropriate filtering a user may indicate the type of vehicle in which he or she is traveling. In at least some such embodiments the filtering which is applied to the detected motion before the detected motion is used for making changes in a virtual environment depend on the user set type of vehicle. In at least some embodiments the type of vehicle is sensed by the VR device, e.g., based on one or more wireless signals detected by the VR device transmitted by the vehicle. For example, automobiles and/or planes may transmit signals to facilitate collision avoidance and/or vehicle identification. Such signals are received and interpreted by the VR device and used to select what type of motion filtering should be applied at a given time based on the type of vehicle the VR device detects it is located within.

While filtering of detected motion is used in some embodiments, in other embodiments a motion sensing device located outside the head mounted VR device is used to provide information about vehicular motion. For example, a second motion sensor device, e.g., a second IMU, may be, and in some embodiments, is located in the environment and provides feedback to the VR device with regard to motion at the location where the second motion sensor device is placed. The second motion sensor device may be an integral part of the vehicle in which the user is located such as a sensor of an airplane or car or can be a user placed sensor such as a motion sensor peripheral device which the user can place on the seat or floor to detect vehicle motion. The vehicle motion information may be communicated to the VR device wirelessly, e.g., using WiFi or other signals or via a wired interface. Thus, in some vehicular environments such as an airplane or car a single on board vehicle motion sensor may provide vehicle motion information to VR devices corresponding to multiple different passengers. In cases where information from a built in vehicle motion sensor is not available a user of a VR device can bring a motion sensor implemented as a peripheral device to the user's VR device. For example, the user of a VR device with a built in head position tracking device can place a second motion sensor device on a seat or the floor of the vehicle allowing the user's VR device to obtain vehicle motion information from the secondary motion detection device.

In embodiments where a second motion sensor is used, e.g., a motion sensor which is in addition to the one in the head mounted VR device, the second motion sensor provides information on detected movement of the vehicle while the head mounted sensor provides motion information reflecting both vehicular movement and movement of the user's head within the vehicle. By subtracting detected vehicular movement detected by the second sensor from the movement detected by the head mounted motion sensor a relatively accurate indication of user head movement is obtained. In one such embodiment the indication of user head movement obtained by subtracting the movement detected by the second sensor from the movement detected by the head mounted sensor is used as the basis for changes in the virtual environment. In this way the effect of vehicular motion on the tracked movement of the user's head can be recued or eliminated with the motion attributable to a user's head movement then being used to control changes in the VR environment to reflect a change in the user's viewing position within the virtual environment.

While a separate motion sensor outside the head mounted VR device is used in some embodiments to detect vehicle motion, in another embodiment the head mounted device captures images of the environment. One or more reference points or objects are then identified within the captured images. Motion which is detected by the head mounted motion sensor but which does not result in a change in the position of the reference points or objects in the head mounted display's camera field of view are interpreted as vehicular motion and disregarded. Motion which coincides with a change in the position of reference points or objects in the camera's field of view is interpreted as head motion and used to control changes in the environment displayed to the user. This technique is particularly well suited for VR devices which use cell phones or other devices with an outward facing camera as part of the head mounted VR device.

An exemplary virtual reality method, in accordance with some embodiment, includes: receiving inertial measurement unit measurement (IMU) information obtained from an inertial measurement unit (IMU) within a head mounted VR device; processing the received inertial measurement unit information to filter out at least some detected motion attributable to motion of a vehicle to generate filtered information, said filtered information including at least one of: filtered orientation information or filtered motion information; and using the filtered information in controlling which portion of a simulated environment is displayed to a user at a given time.

An exemplary head mounted virtual reality (VR) device in accordance with some embodiments, includes: an inertial measurement unit; a module configured to receive inertial measurement unit measurement (IMU) information obtained from the inertial measurement unit (IMU) within the head mounted VR device; a module configured to process the received inertial measurement unit information to filter out at least some detected motion attributable to motion of a vehicle to generate filtered information, said filtered information including at least one of: filtered orientation information or filtered motion information; and a module configured to use the filtered information in controlling which portion of a simulated environment is displayed to a user at a given time.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows. Numerous additional features and embodiments are possible.

Detailed Description

Figure 1:
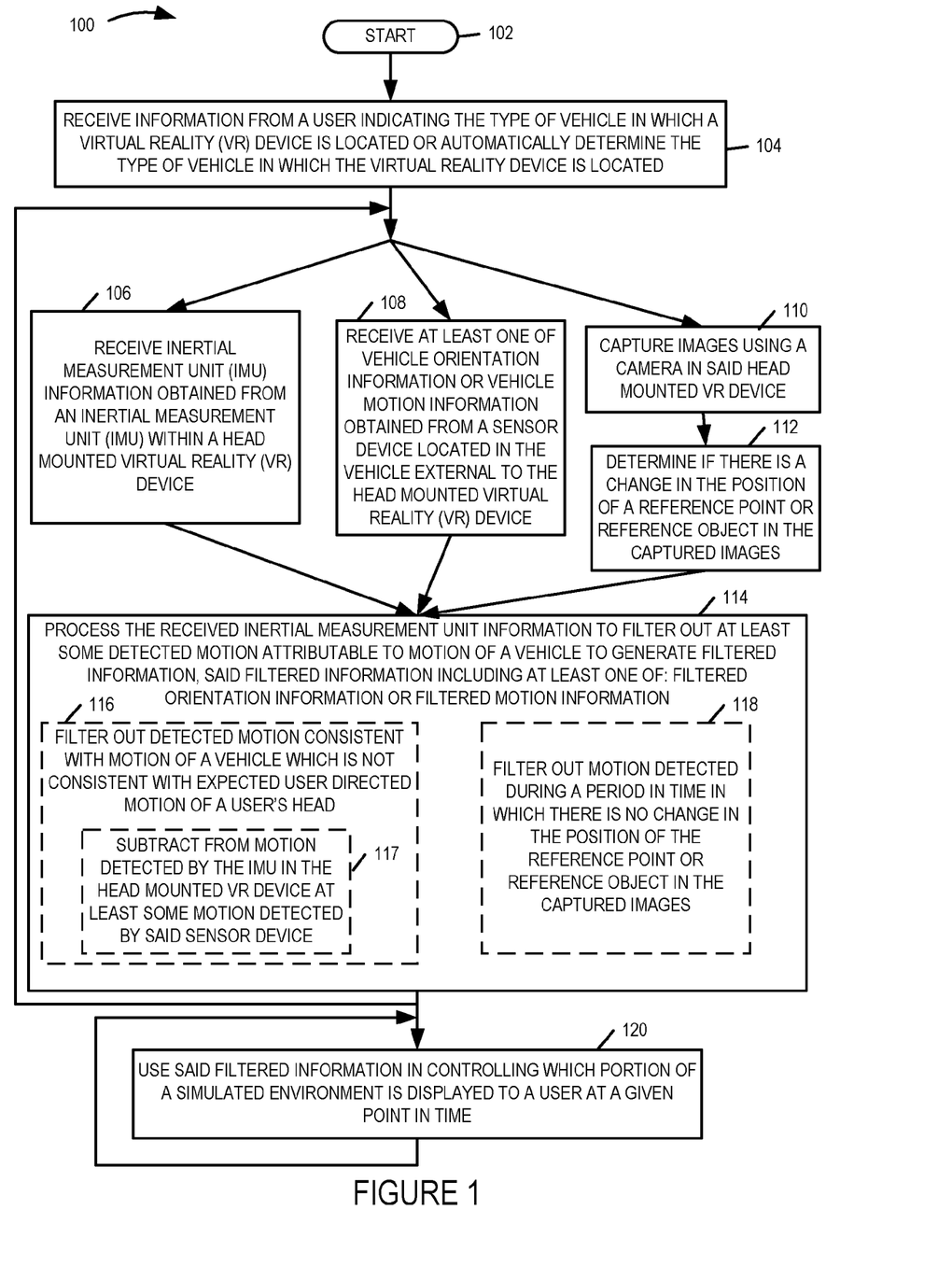
FIG. 1 is a flowchart of an exemplary virtual reality method in accordance with various exemplary embodiments.

FIG. 1 is a flowchart 100 of an exemplary virtual reality method in accordance with various exemplary embodiments. In various embodiments, the exemplary method of flowchart 100 is performed by a virtual reality device, e.g., a head mounted virtual reality device including a processor, and the flowchart 100 will be described for such an embodiment. In some other embodiments, the method of flowchart 100 is performed by a device including a processor, and the device is coupled to a head mounted VR device.

Operation starts in step 102 in which the VR device is powered on and initialized. Operation proceeds from start step 102 to step 104, in which the VR device receives information from a user indicating the type of vehicle in which the VR device is located or automatically determines the type of vehicle in which the virtual reality device is located. In some embodiment, the user input is received via a user input device coupled to the head mounted virtual reality device. Exemplary user input includes information identifying one of a plurality of alternative vehicle types, e.g., plane, car, train, ship, etc., and information identifying a specific vehicle model and/or specific vehicle manufacturer, e.g., information identifying that the vehicle type is an airplane and information identifying that the airplane is one of: a Boeing 773 jet, a Boeing 747 jet, an Airbus A320 jet, or Airbus A380 jet. In various embodiments different sets of information are stored corresponding to different types of vehicles and/or specific vehicles models and/or manufactures, e.g., different dynamic vehicle profile information, and the stored information is retrieved and used in filter out at least some vehicle motion. In some embodiments, different alternative filters or sets of filter parameters are selected based on the vehicle type, vehicle model and/or vehicle manufacturer information. In some embodiments, the automatic determination is based on a received wireless signal, e.g., from a vehicle identification transmitter device within the vehicle. In some embodiments, the automatic detection is based on a condition, e.g., a detected of velocity or acceleration consistent with a vehicle type, a detected profile consistent with a vehicle type, e.g., a rate of climb and/or turn profile consistent with a vehicle type, a detected vibration profile consistent with a vehicle type, etc. Operation proceeds from step 104 to steps 106, 108 and 110, which may be performed in parallel.

In step 106, the head mounted VR device receives inertial measurement unit (IMU) information obtained from an inertial measurement unit (IMU) in the head mounted VR device. In some embodiments, the IMU includes 3 or more gyroscopes and three or more accelerometers and optionally a magnetic heading sensor.

In step 108 the VR device receives at least one of vehicle orientation or vehicle motion information obtained from a sensor device located in the vehicle external to the head mounted device. In some embodiments, the sensor device is a second IMU. In some embodiments, the sensor device is a GPS device. In some embodiments, the sensor device is a navigation system or attitude heading reference system including an IMU. In some embodiments, the sensor device is a Global Positioning System/Inertial Navigation System (GPS/INS) device. In some embodiments, the sensor device include a magnetic sensor, e.g. for obtaining magnetic heading. In some embodiments, the sensor device includes a baro altimeter.

In some embodiments, the sensor device is one of a sensor device built into the vehicle or a sensor device placed in the vehicle by a user of said head mounted VR device. In some embodiments, the sensor device is one of a sensor device built into the vehicle or a sensor device placed in the vehicle by a service provider associated with providing a VR service to a user. In some embodiments, the sensor device placed in the vehicle by the user is a smart phone including an IMU.

In step 110 the VR device captures images using a camera in said head mounted VR device. The captured images may, and sometimes do, include a reference point or reference object. For example, there may be a number of known predetermined reference objects situated at different fixed locations within the vehicle. Alternatively, the VR device may define a reference point or reference object in the vehicle, which will remain fixed with respect to the vehicle as the vehicle moves, from information obtained in a captured image. Operation proceeds from step 110 to step 112. In step 112 the VR device determines if there is a change in the position of a reference point or reference object in the captured images.

Operation proceeds from step 106, 108 and 112 to step 114. In step 114 the VR device processes the received inertial measurement unit information to filter out at least some detected motion attributable to motion of a vehicle to generate filtered information including at least one of filtered orientation information or filtered motion information. In various embodiments, step 114 includes one or both of steps 116 and 118.

In step 116 the VR device filters out detected motion consistent with motion of a vehicle which is not consistent with expected user directed motion of a user's head. In some embodiments, filtering out detected motion consistent with motion of a vehicle is based on information about a type of vehicle in which the virtual reality device is located. In some embodiments, filtering out detected motion consistent with motion of a vehicle includes using a first filter if the type of vehicle is an airplane type and a second filter if the type of vehicle is an automobile type, said first filter type taking into consideration expected changes in head angle corresponding to a plane taking off or landing.

In some embodiments, filtering out detected motion consistent with motion of a vehicle is based on information about a specific sub-class of a type of vehicle. In some embodiments, different filters or different sets of filter constants are used corresponding to different types of vehicles. In some embodiments, different filters or different sets of filter constants are used corresponding to different subclasses of a vehicle type.

In some embodiments, the vehicle is an airplane, and the filtered out detected motion is vibration, e.g., vibration during takeoffs, landings, turbulence. etc. In some embodiments, the vehicle is an airplane and the filtered out detected motion is a climb profile or descent profile. In some embodiments, the vehicle is an airplane, and the filtered out detected motion is motion in accordance with a planned flight path profile, e.g., including planned heading changes. In some embodiments, the vehicle is an airplane and the filtered out detected motion is motion due to banked turns on a flight path.

In some embodiments, the vehicle is a road vehicle, e.g., a car, and the filtered out detected motion is vibration, e.g., vibration due to road irregularities and type of suspension.

In some embodiments, the vehicle is a water vehicle, e.g., a ship, and said filtered out detected motion is at least one of a roll motion or pitch motion, e.g., in accordance with expected vehicle characteristics for expected water and/or wind conditions.

In some embodiments, the vehicle is a train, and the filtered out detected motion is vibration, e.g., expected vibration due to track conditions and current vehicle speed. In some embodiments, the vehicle is a train, and the filtered out detected motion is motion in accordance with a planned train route including heading changes in accordance with turns and tilt changes in accordance with altitude changes.

In some embodiments, step 116 includes step 117 in which the VR device subtracts from motion detected by the IMU in the head mounted VR device at least some motion detected by said sensor device. For example, motion detected by a vehicle mounted or user placed sensor device is subtracted from motion detected by the IMU in the head mounted VR device.

In step 118 the VR device filters out motion detected during a period of time in which there is no change in the position of the reference point or reference object in the captured images.

Operation proceeds from step 114 to step 120 in which the VR device uses said filtered information in controlling which portion of a simulated environment is displayed to a user at a given point in time.

In various embodiments, the received inertial measurement information from the IMU in the head mounted device, and the received information from the sensor device located in the vehicle external to the head mounted VR device may be, and sometimes are, received at different rates, e.g., on an ongoing basis. In addition, captured images and determined changes of a reference point or object are performed on an ongoing basis. In some embodiments, at different times different input is available and used to filter out vehicle motion. For example at some times filtering of vehicle motion is based on filter parameters determined based on the type and subclass of vehicle, inertial measurement unit information received from a vehicle high accuracy navigation system, and determined changes in a reference object in a set of captured images. At other times, the vehicle interior including the head mounted device may be dark and position changes based on captured image may not be possible.

The processing and filtering out of vehicle motion may be, and sometimes is, performed at a different rate than the rate used to control the display of portions for the simulated environment.

Figure 2:
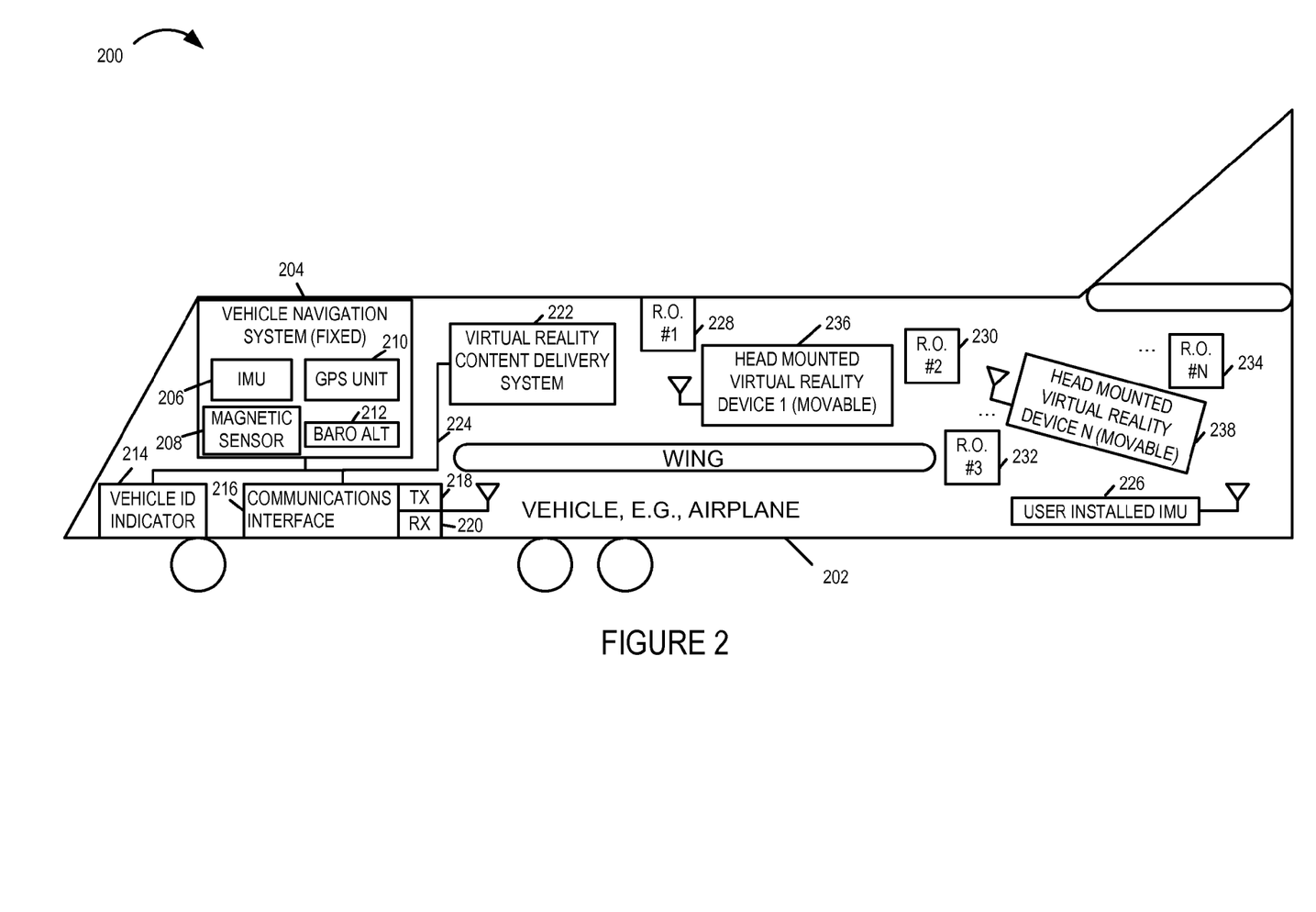
FIG. 2 is a drawing of an exemplary vehicle including a head mounted VR device in accordance with an exemplary embodiment.

FIG. 2 is a drawing 200 of an exemplary vehicle 202, e.g., an airplane, in accordance with an exemplary embodiment. Vehicle 202 includes a vehicle navigation system 204, e.g., a high accuracy navigation system, which is fixed to the structure of the vehicle. Navigation system 204 is a sensor device. Navigation system 204 includes an inertial measurement unit (IMU) including a plurality, e.g., three or more gyroscopes, and a plurality of accelerometers, e.g., 3 accelerations in an accelerometer triad, e.g., with each accelerometer mounted to have an input axis substantially orthogonal to the other two. Navigation system 204 further includes a magnetic sensor 208 for determining magnetic heading, a GPS unit 210, e.g., including one or more GPS receivers, e.g., for measuring vehicle velocity, position heading and altitude based on received GPS signals, and a baro altimeter 212 used for determining altitude. Navigation system 204, in some embodiments, also includes additional navigation devices, e.g., based on radar signals, sonar signals, radio frequency signals, beacons, camera images, etc.

Vehicle 202 further includes one or more head mounted virtual reality devices (head mounted virtual reality device 1 236, . . . , head mounted virtual reality device N 238). The head mounted virtual reality devices (236, . . . , 238) are moveable. The position and/or orientation of a head mounted virtual reality device with respect to a vehicle reference frame may change over time, e.g., as a user of the head mounted virtual reality device moves his head and/or moves within the cabin of the vehicle. Head mounted virtual reality device 1 236 is shown at a different orientation with respect to the vehicle 202 than head mounted virtual reality device N 238.

Vehicle 202 further includes a vehicle ID indicator 214 for communicating signals including vehicle type information, e.g., identifying the vehicle as an airplane, identifying the airplane as a particular type of airplane, e.g., manufacturer and model, and/or for communicating parameters associated with the vehicle. In some embodiments, different types of vehicles and/or different models of a type of vehicle are associated with different dynamic characteristics, e.g., different maximum velocity, different rates of claim and descent, and different vibration profiles, and different filters or different filter parameters values are used by a virtual reality device, e.g., a head mounted VR device, when filtering out vehicle motion.

Vehicle 202 further includes a virtual reality content delivery system 222, e.g., which provides content, e.g., stereoscopic image content corresponding to a virtual reality environment. In various embodiments, multiple alternative images and/or multiple alternative image portions are available to present to a VR user at a given point in time to a head mounted VR device. Vehicle 202 further includes a communications interface 218 including a transmitter 218 and receiver 220 coupled to an antenna. The vehicle navigation system 204, the vehicle ID indicator 214, and the virtual reality content delivery system 222 are coupled to the communications interface 216 via which the various devices (204, 214, 222) may communicate with the head mounted virtual reality devices (236, . . . , 238), e.g., providing information used to filter out vehicle motion and delivering virtual reality content.

Vehicle 202 further includes a plurality of reference objects (reference object 1 228, reference object 2 230, reference object 3 232, . . . , reference object N 234) located at known fixed locations throughout the vehicle. The reference objects (228, 230, 232, . . . , 234) can be, and sometimes are, used by a head mounted VR device (236, . . . , 238) in filtering out vehicle motion based on captured images including a reference object.

Vehicle 202 further includes a user installed IMU 226 including gyroscopes and accelerometers and further including a wireless interface for communicating with head mounted VR devices. In various embodiments, the user installed IMU 226 is placed in the vehicle, e.g., by a user of the head mounted VR device, e.g., on the floor of the vehicle beneath the seat or at another location in the vicinity of the user of a head mounted VR device. In some embodiments, the IMU 226 is secured to a fixed mount in the vehicle, e.g., via a clamp or a strap, e.g., via a velcro attachment. In other embodiments, the IMU 226 is placed in a location in which it is substantially secure and unlikely to move, e.g., based on weight. In various embodiments, the user installed IMU 226 is used in place of the vehicle navigation system 204, by a head mounted VR device to obtain vehicle inertial measurement information. In some other embodiments, the user installed IMU 226 is used in addition to the vehicle navigation system 204, by a head mounted VR device, to obtain additional vehicle inertial measurement information. In one embodiment, the user installed IMU 226 is part of a second smart phone, e.g., a second smart phone belonging to the user of the head mounted device.

Figure 3:
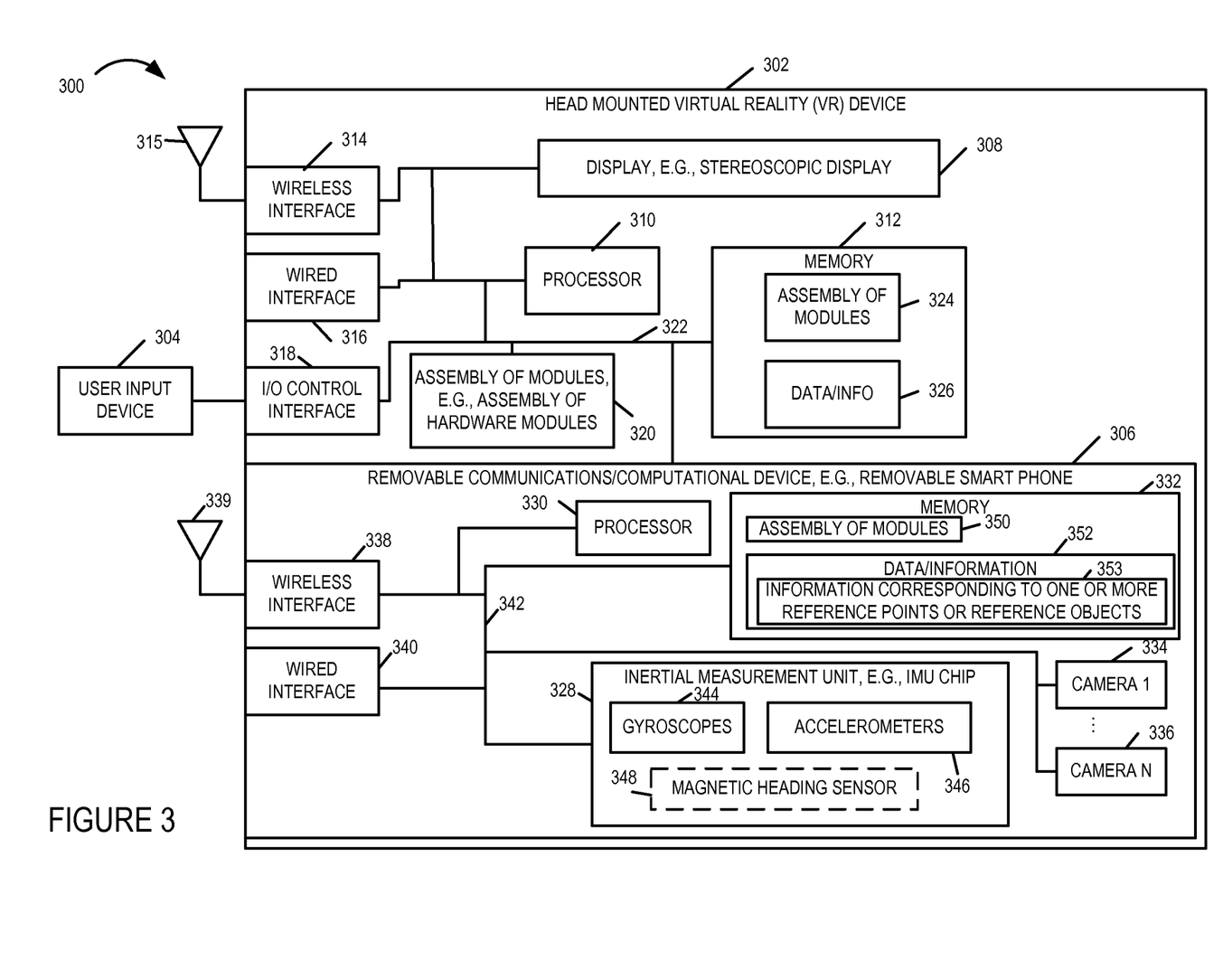
FIG. 3 is a drawing of an exemplary head mounted virtual reality (VR) device coupled to a user input device, in accordance with an exemplary embodiment.

FIG. 3 is a drawing 300 of an exemplary head mounted virtual reality (VR) device 302 coupled to a user input device 304, in accordance with an exemplary embodiment. Exemplary head mounted virtual reality device 302 is, e.g., the virtual reality device implementing a method of flowchart 100 of FIG. 1 or flowchart 400 of FIG. 4, and/or one of the head mounted VR devices (236, . . . , 238) of FIG. 2. Exemplary head mounted VR device 302 includes the capability to filter out at least some vehicle motion, e.g., based on captured images including a reference point or reference object, inertial measurement information, e.g., from an external IMU and from an IMU within the head mounted VR device, and based on other received or derived information, e.g., a vehicle type information, a route profile, etc.

Head mounted VR device 302 includes a removable communications/computational device 306, e.g., a removable smart phone, a display 308, e.g, a stereoscopic display, a processor 310, e.g., a CPU, memory 312, a wireless interface 314 including a receiver and a transmitter, coupled to antenna 315, a wired interface 316 including a transmitter and a receiver, an I/O interface 318, and an assembly of modules 320, e.g., an assembly of hardware modules 320, e.g., circuits, coupled together via a bus 322 over which the various elements (306, 308, 310, 312, 314, 316, 318, 320) may interchange data and information. Memory 312 includes an assembly of modules 324, e.g., an assembly of software modules, and data/information 326.

Removable communications device 306 includes an inertial measurement unit 328, e.g., an IMU included as part of a chip, a processor 330, memory 332, a plurality of cameras (camera 1 334, . . . , camera N 336), a wireless interface 338 including a receiver and a transmitter, which is coupled to antenna 339, and a wired interface 340 including a receiver and transmitter, coupled together via a bus 342 via which the various elements (328, 330, 332, 334, 336, 338, 340) may interchange data and information. Inertial measurement unit 328 includes gyroscopes 344, e.g., three or more gyroscopes, and accelerometers, e.g., 3 or more accelerometers. In various embodiments, IMU 328 further includes a magnetic heading sensor 348.

Memory 332 includes assembly of modules 350, e.g, an assembly of software modules, and data/information 352. Data/information 326 and/or data/information 352 includes, e.g., received user information used to identify a type of vehicle in which the head mounted VR device is located, received information used to automatically determine a type of vehicle the head mounted VR device is located, a determined type of vehicle, a determined sub-class of vehicle, stored information mapping different vehicle types and/or different vehicle sub-classes to different filters, different dynamic profiles, and/or different sets of filter values used for removing vehicle motion, received vehicle path information, received IMU information from an IMU in the head mounted VR device, received sensor information from a sensor device located in the vehicle external to the head mounted VR device, stored reference information 353 corresponding to a set of one or more reference points or reference objects which may appear in captured images, determined changes based on captured images including a reference point or reference object, coordinate system transformation information, determined motion information based on an IMU in the head mounted VR device, determined motion information based on a second IMU, e.g., vehicle IMU, estimated user induced motion of the head mounted VR device after removal of estimated vehicle motion, and a selected image portion to be presented to a user of the head mounted VR device.

User input device 304 communicates user input, e.g., information from a user indicating a type of vehicle in which the head mounted VR device is currently located, information indicating a seat position in the vehicle, information indicating that the user wants to start initialization of the head mounted VR device, etc, to the head mounted VR device 302 via I/O interface 318.

The inertial measurement unit 328 uses its sensors to perform measurements and outputs inertial measurement unit information, e.g., measured changes in velocity and angle over time. Cameras (334, ..., 336) capture images, e.g., images including reference objects or reference points, which can be and sometimes are used to filter out at least some vehicle motion.

Display 308 displays to a user of the head mounted device a selected portion of a simulated environment at a give time, the selection of a portion being based on data subsequent to filtering which removed at least some vehicle motion.

In this example, the IMU 328 is shown as being part of a removable communications/computational device. In some other embodiments, the IMU 328 is included as part of head mounted virtual reality device 302 but is not removable, e.g., IMU 328 is permanently built in to the head mounted VR device. In some such embodiments, the IMU includes discrete hardware components, e.g., discrete gyroscopes and accelerometers coupled together. In some such embodiments, this configuration provides a higher level of accuracy than is possible using an IMU on a chip.

Figure 4:
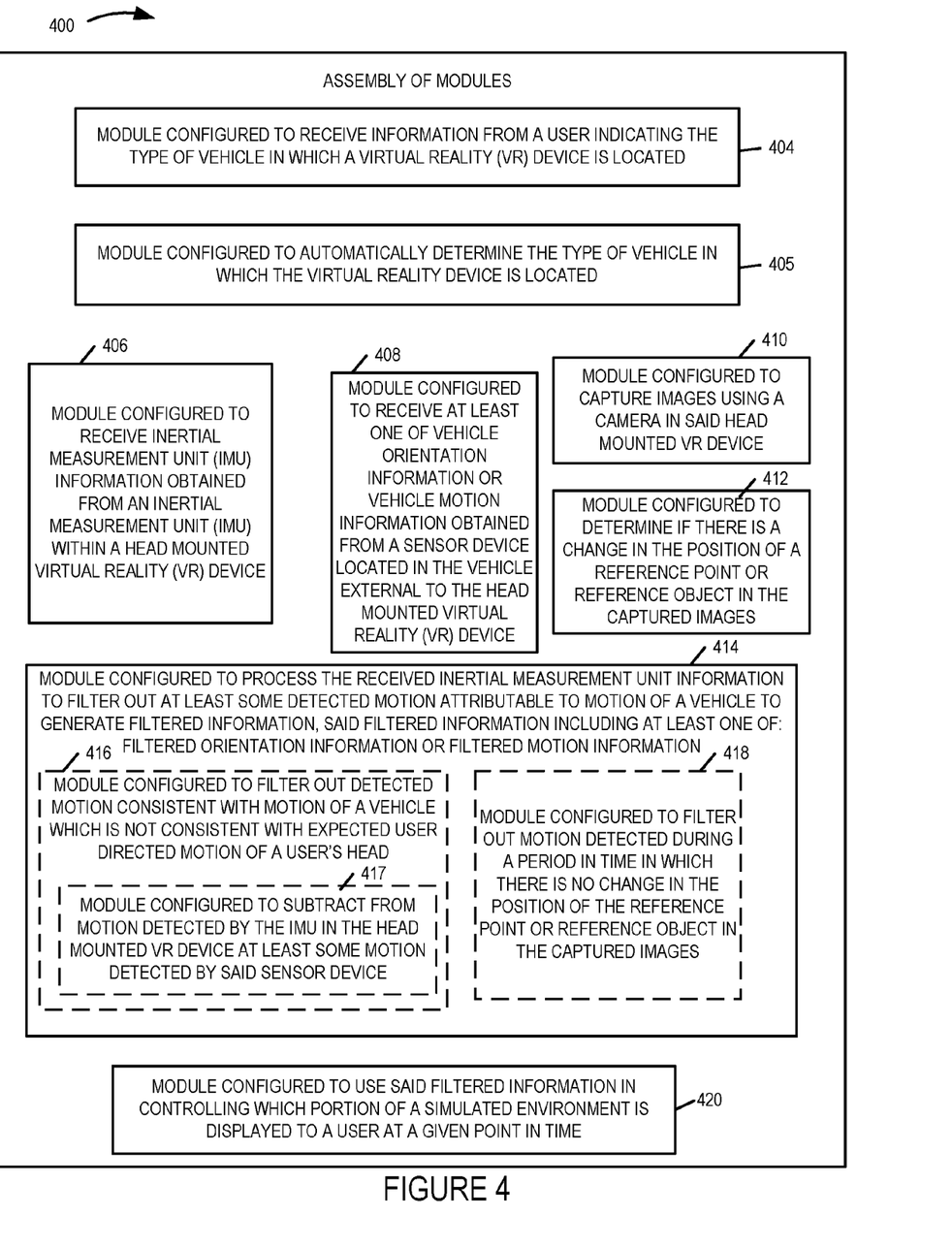
FIG. 4 is a drawing of an exemplary assembly of modules which may be included in a head mounted VR device in accordance with an exemplary embodiment.

FIG. 4 is a drawing of an assembly of modules 400, in accordance with an exemplary embodiment. In some embodiments, assembly of modules 400 is included in a virtual reality device, e.g., a head mounted virtual reality device, e.g., head mounted virtual reality (VR) device 302 of FIG. 3.

The modules in the assembly of modules 400 can, and in some embodiments are, implemented fully in hardware within the processor 330 or 310, e.g., as individual circuits. The modules in the assembly of modules 400 can, and in some embodiments are, implemented fully in hardware within the assembly of modules 320, e.g., as individual circuits corresponding to the different modules. In other embodiments some of the modules are implemented, e.g., as circuits, within the processor 330 or 310 with other modules being implemented, e.g., as circuits within assembly of modules 320, external to and coupled to the processor 330 or 310. As should be appreciated the level of integration of modules in the processor and/or with some modules being external to the processor may be one of design choice.

Alternatively, rather than being implemented as circuits, all or some of the modules may be implemented in software and stored in the memory 332 or 312 of the head mounted VR device 302, with the modules controlling operation of head mounted VR device 302 to implement the functions corresponding to the modules when the modules are executed by a processor, e.g., processor 330 or 310. In some such embodiments, the assembly of modules 400 is included in the memory 332 or 312 as assembly of modules 350 or 324. In still other embodiments, various modules in assembly of modules 400 are implemented as a combination of hardware and software, e.g., with another circuit external to the processor providing input to the processor 330 or 310 which then under software control operates to perform a portion of a module's function. While shown in the FIG. 3 embodiment as a single processor 330, e.g., computer, in removable communications/computational device 306 it should be appreciated that the processor 306 may be implemented as one or more processors, e.g., computers. While shown in the FIG. 3 embodiment as a single processor 310, e.g., computer, it should be appreciated that the processor 310 may be implemented as one or more processors, e.g., computers. In some embodiments, a single processor is used in place of processors 330 and 310.

When implemented in software the modules include code, which when executed by the processor 330 or 310, configure the processor 330 or 310 to implement the function corresponding to the module. In embodiments where the assembly of modules 400 is stored in the memory 332 or 312, the memory 332 or 312 is a computer program product comprising a computer readable medium comprising code, e.g., individual code for each module, for causing at least one computer, e.g., processor 330 or 310, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 4 control and/or configure the head mounted VR device 302 or elements therein such as the processor 330 or 310, to perform the functions of corresponding steps illustrated in the method of the flowchart of FIG. 1, and/or described with respect to any of the Figures. Thus the assembly of modules 400 includes various modules that perform functions of corresponding steps of one or more of FIG. 1.

Assembly of modules 400 includes a module 404 configured to receive information from a user indicating the type of vehicle in which the virtual reality (VR) device is located, a module 405 configured to automatically determine the type of vehicle in which the virtual reality device is located, a module 406 configured to receive inertial measurement unit (IMU) information obtained from an inertial measurement unit (IMU) within a head mounted VR device, and a module 408 configured to receive at least one of vehicle orientation information or vehicle motion information obtained from a sensor device located in the vehicle external to the head mounted virtual reality (VR) device. In some embodiments, said sensor device is a second IMU. In various embodiments, the sensor device is a GPS device. In some embodiments, said sensor device is one of a Global Positioning System/Inertial Navigation System (GPS/INS) device or a Global Positioning System/Attitude Heading Reference System (GPS/AHRS) device. In some embodiments, said sensor device includes a magnetic sensor. In some embodiments, said sensor device includes a baro altimeter. In some embodiments, said sensor device is one of a sensor device built into the vehicle or a sensor device placed in the vehicle by a user of said head mounted VR device.

Assembly of modules 400 further includes a module 410 configured to capture images using a camera in said head mounted VR device, and a module 412 configure to determine if there is a change in the position of a reference point or reference object in the captured images.

Assembly of module 400 further includes a module 414 configure to process the received inertial measurement unit information to filter out at least some detected motion attributable to motion of a vehicle to generate filtered information, said filtered information including at least one of filtered orientation information or filtered motion information. Module 414 includes a module 416 configured to filter out detected motion consistent with motion of a vehicle which is not consistent with expected user directed motion of a user's head, and a module 418 configured to filter out motion detected during a period of time in which there is no change in the position of the reference point or reference objects in the captured images. In some embodiments, said module 416 configured to filter out detected motion consistent with motion of a vehicle uses a first filter if the type of vehicle is an airplane type and a second filter if the type of vehicle is an automobile type, said first filter type taking into consideration expected changes in head angle corresponding to a plane taking off or landing. In some embodiments, filtering out detected motion consistent with motion of a vehicle is based on information about a type of vehicle in which the virtual reality device is located. In some embodiments, said vehicle is an airplane and said filtered out detected motion is vibration, e.g., vibration during takeoff-flandings, turbulences, etc. In some embodiments, said vehicle is a car and said filtered out detected motion is vibration, e.g., vibration due to road irregularities and type of suspension in car. In some embodiments, said vehicle is a ship and said filtered out detected motion is at least one of roll motion or pitch motion.

Module 416 includes a module 417 configured to subtract from motion detected by the IMU in the head mounted VR device at least some motion detected by the sensor device. For example, in one embodiment, module 417 subtracts motion detected by a fixed vehicle navigation system from motion detected by the IMU in the head mounted VR device.

Assembly of modules 400 further includes a module 420 configured to use said filtered information in controlling which portion of a simulated environment is displayed to a user at a given point in time.

Figure 5:
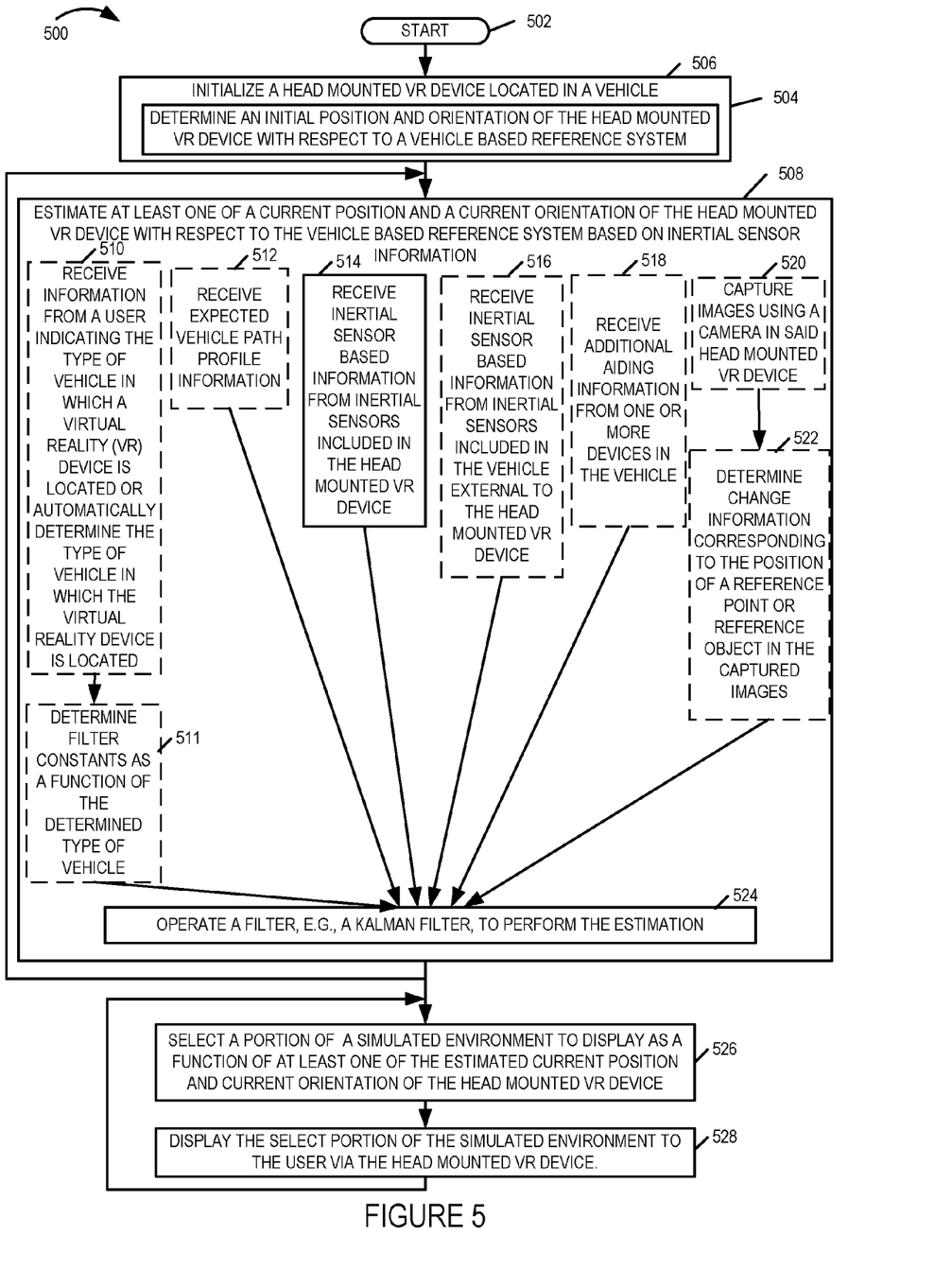
FIG. 5 is a flowchart of an exemplary virtual reality method in accordance with various exemplary embodiments.

FIG. 5 is a flowchart 500 of an exemplary virtual reality method in accordance with various exemplary embodiments. In various embodiments, the exemplary method of flowchart 500 is performed by a virtual reality device, e.g., a head mounted virtual reality device including a processor, and the flowchart 500 will be described for such an embodiment. In some other embodiments, the method of flowchart 500 is performed by a device including a processor, and the device is coupled to a head mounted VR device.

Operation starts in step 502 in which the head mounted VR device is powered on. Operation proceeds from step 502 to step 504. In step 504 the head mounted VR device, which is located in a vehicle is initialized. Step 504 includes step 506 in which the head mounted VR device determines an initial position and orientation of the head mounted VR device with respect to a vehicle based reference system. In some embodiments, the vehicle and VR device are stationary when initialization occurs. In some other embodiments, the vehicle may be moving and the head mounted VR device is stationary with respect to the vehicle when initialization occurs. In some embodiments, the head mounted VR device is at a known location within the vehicle when initialization occurs, e.g., based on a specific seat location within the vehicle and a mapping between seat locations and positions within the vehicle. In some embodiments, output information from a high accuracy vehicle based navigation system or attitude heading reference system is used in conjunction with head mounted VR device inertial measurement sensor information and/or head mounted VR device camera image capture information, e.g., including a known reference point or object, in determining an initial position and/or initial orientation of the head mounted VR device with respect to a vehicle based reference system. In one embodiment, the vehicle based reference system has its origin at the location of the head mounted VR device during initialization. In some such embodiments, lever arms with respect to reference system of the vehicle mounted navigation system or attitude heading reference system of the vehicle are known and loaded into the head mounted VR device.

Operation proceeds from step 504 to step 508. In step 508 the head mounted VR device estimates at least one of a current position and a current orientation of the head mounted VR device with respect to the vehicle based reference system based on inertial sensor information. In various embodiments, additional information may be, and sometimes is, used in addition to the inertial sensor information in performing the estimation.

Step 508 includes steps 514 and 524, and further includes one or more of optional steps 510, 511, 512, 516, 518, 520 and 522. In step 510 the head mounted VR device receives information from a user indicating the type of vehicle in which the head mounted VR device is located, e.g., a plane, a car, a train, a ship, etc. In some embodiments, the type of vehicle further includes sub-classification information, e.g., information identifying a particular jet airplane model, e.g., with different dynamic profile information associated with different sub-classifications, e.g., different maximum velocity information corresponds to different sub-classifications, etc. Operation proceeds from step 510 to step 511 in which the head mounted VR device determines filter constants as a function of the determined type of vehicle.

In step 512 the head mounted VR device receives expected vehicle path profile information. In some embodiments, the expected vehicle path profile information includes takeoff and landing profile including, e.g., expected vibration levels, expected rate of climb information, expected rate of descent information, and expected turning, e.g., banking profile information, and expected cruising profile information, e.g., expected levels of vibration when cruising at a fixed altitude. In some embodiments, the expected vehicle profile information includes a train route including expected acceleration, deceleration, and vibration level information corresponding to different points along the route. In some embodiments, the expected vehicle path profile information includes expected vibration levels due to road surface conditions corresponding to different points along the path.

In step 514 the head mounted VR device receives inertial sensor based information from inertial sensors included in the head mounted VR device. In some embodiments, the inertial sensors include accelerometers and gyroscopes, e.g., three accelerometers in a triad, and three gyroscopes. In some such embodiments, the inertial sensors are included in an inertial measurement unit, e.g., an IMU such as an IMU on a chip. In some embodiments, the inertial sensor based information includes measurements of changes in velocity and measurements in changes in angle, e.g., over a given predetermined time intervals, e.g., every 40 msec or every 100 msec. In some embodiments, the inertial sensor based information includes navigation solution information including, e.g., latitude, longitude, altitude, velocity information, tilt information, orientation information, roll, pitch, and/or heading information.

In step 516 the head mounted VR device receives inertial sensor based information from inertial sensors included in vehicle external to the head mounted VR device. In some embodiments, the inertial sensors external to head mounted VR device include accelerometers and gyroscopes, e.g., three discrete accelerometers in a triad, and three gyroscopes, e.g., ring laser, fiber optic or tuned rotor gyroscopes. In some such embodiments, at least some of the inertial sensors external to head mounted VR device are included in an inertial measurement unit, e.g., an IMU. In some such embodiments, the IMU is part of a vehicle high accuracy navigation system or attitude heading reference system. In some embodiments, the high accuracy navigation system is an INS/GPS system which blends inertial and GPS information. In some embodiments, the inertial sensor based information includes measurements of changes in vehicle velocity and measurements in changes in vehicle angle, e.g., over a given predetermined time intervals. In some embodiments, the inertial sensor based information includes vehicle navigation solution information, tilt information, orientation information, and/or heading information.

In step 518 the head mounted VR device receives additional aiding information from one or more devices in the vehicle, e.g., baro altimeter information, magnetic heading sensor information, GPS information, etc.

In step 520, the head mounted VR device captures images using a camera in said head mounted VR device. Operation proceeds from step 520 to step 522 in which the head mounted VR device determines change information corresponding to the position of a reference point or reference object in the captured images.

Operation proceeds from step 514 and one or more or all of steps 511, 512, 516, 518 and 522 to step 524. In step 524 the head mounted VR device operates a filter, e.g., a Kalman filter, to perform the estimation of a least one of a current position and a current orientation of the head mounted VR device with respect to the vehicle based reference system. In step 524 one or more or all of the determined or received information from steps 511, 512, 514, 516, 518, and 522 are used by the filter in performing the estimation. At different times different information may be available to be used by the filter. For example, at some times determined change information corresponding to the position of a reference point or reference object in the captured images may not be available, e.g., because a reference point or reference object is not within the field of view of camera device, a person or object is obstructing the path between the camera and the reference point or object, or the light level in the cabin of the vehicle is not a sufficient quality level to capture images and identify a reference point or reference object.

Operation proceeds from step 508 to step 526. In step 526 the head mounted VR device selects a portion of a simulated environment to display as a function of at least one of the estimated current position and current orientation of the head mounted VR device with respect to the vehicle based reference system. Operation proceeds from step 526 to step 528, in which the head mounted VR device displays the selected portion of the simulated environment to the user via the head mounted VR device.

Step 508 is performed repetitively, on an ongoing basis. Steps 526 and 528 are also repeated repetitively on an ongoing basis. The rate of filter updates and image portion selection may be, and generally are, different.

In various embodiments, the estimating of step 508 including filtering of step 524 removes at least some motion attributable to the vehicle such that the simulated environment portion selection of step 526 is based predominately on user induced head motion. Thus the user can have the same or nearly same VR experience whether the vehicle including the user is stationary or is moving.

Figure 6:
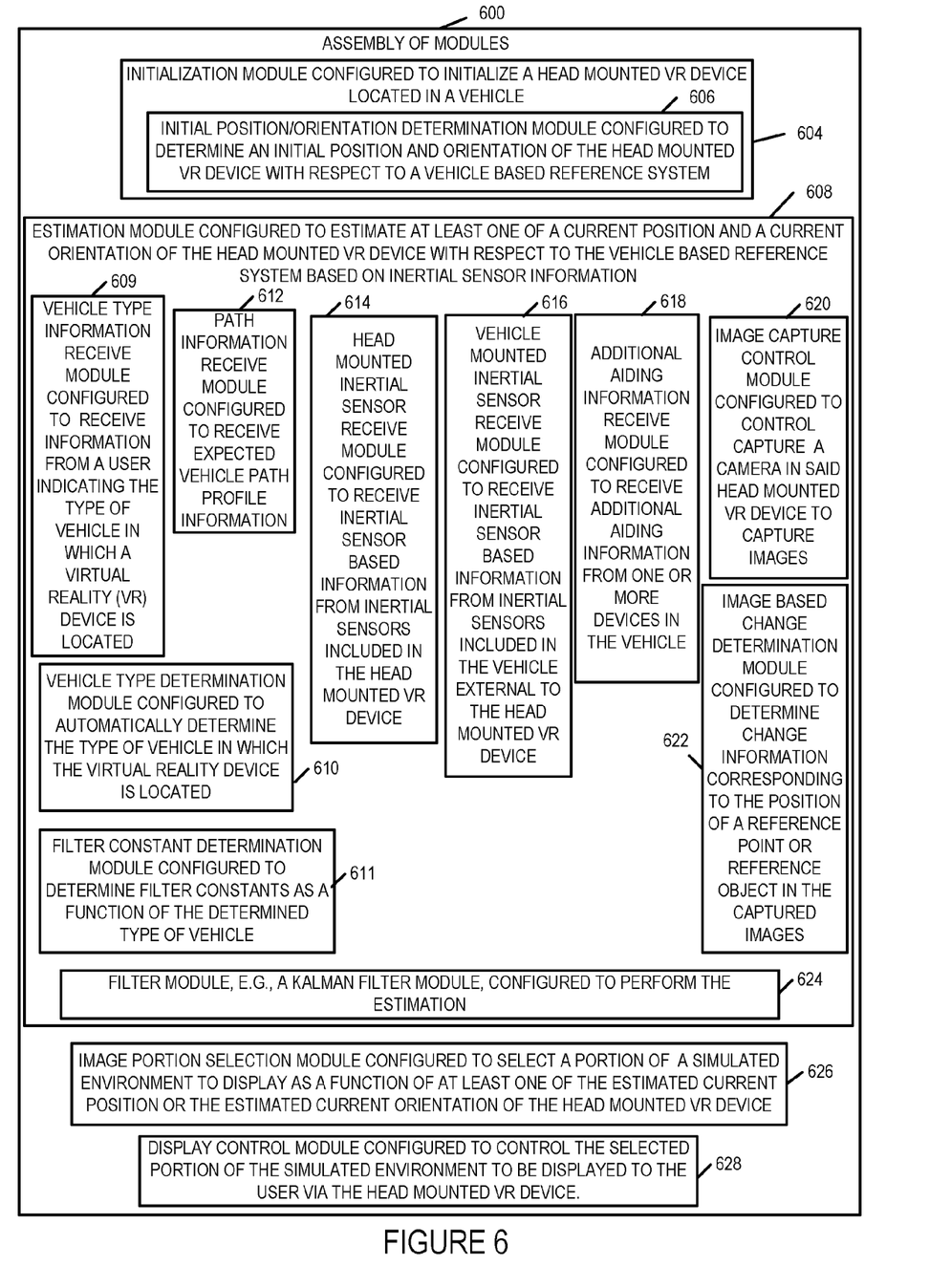
FIG. 6 is a drawing of an exemplary assembly of modules which may be included in a head mounted VR device in accordance with an exemplary embodiment.

FIG. 6 is a drawing of an assembly of module 600, in accordance with an exemplary embodiment. In some embodiments, assembly of modules 600 is included in a virtual reality device, e.g., a head mounted virtual reality device.

Assembly of modules 600 includes an initiation module 604 configured to initialize a head mounted VR device located in a vehicle, an estimation module 608 configured to estimate at least one of a current position and a current orientation of the head mounted VR device with respect to a vehicle based reference system based on inertial sensor information, an image portion selection module 626 configured to select a portion of a simulated environment to display as a function of at least one of the estimated current position or the estimated current orientation of the head mounted VR device, and a display control module 628 configured to control the selected portion of the simulated environment to be displayed to the user via the head mounted VR device.

Initialization module 604 includes an initial position/orientation determination module 606 configured to determine an initial position and orientation of the head mounted VR device with respect to a vehicle based reference system.

Estimation module 608 includes a vehicle type information receive module 609 configured to receive information from a user indicating the type of vehicle in which a virtual reality device, e.g., head mounted VR device, is located, a vehicle type determination module 610 configured to automatically determine the type of vehicle in which the virtual reality device is located, a filter constant determination module 611 configured to determine filter constants as a function of the determined type of vehicle. Estimation module 608 further includes a path information receive module configured to receive expected vehicle path profile information, a head mount inertial sensor receive module 614 configured to receive inertial sensor based information from inertial sensors included in the head mounted VR device, a vehicle mounted inertial sensor receive module 616 configured to receive inertial sensor based information from inertial sensors included in the vehicle external to the head mounted VR device, an additional aiding information receive module 618 configured to received additional adding information from one or more devices included in the vehicle, e.g., from a magnetic heading sensor device, from a baro altimeter device, from a GPS device, from a radar based aiding device, etc. Estimation module 608 further includes an image capture control module 620 configured to control a camera included in the head mounted VR device to capture images, and a image based change determination module 622 configured to determine change information corresponding to the position of a reference point of reference object in the captured images.

Assembly of modules 600 further includes a filter module 622, e.g., a Kalman filter module, configured to perform the estimation. Filter module 624 uses information from one or more or all of modules 611, 614, 616, 618, and 622 and/or stored information mapping to information obtained from one or more or all of modules 609, 610, 611, 612, 614, 616, 618, 620 and/or 622 in performing the estimation. At different times, information from different sources may be available to be used. At different times, different weights may be applied to information corresponding to different sources.

FIG. 6 is a drawing of an assembly of module 600, in accordance with an exemplary embodiment. In some embodiments, assembly of modules 600 is included in a virtual reality device, e.g., a head mounted virtual reality device, e.g., head mounted virtual reality (VR) device 302 of FIG. 3.

The modules in the assembly of modules 600 can, and in some embodiments are, implemented fully in hardware within the processor 330 or 310, e.g., as individual circuits. The modules in the assembly of modules 600 can, and in some embodiments are, implemented fully in hardware within the assembly of modules 320, e.g., as individual circuits corresponding to the different modules. In other embodiments some of the modules are implemented, e.g., as circuits, within the processor 330 or 310 with other modules being implemented, e.g., as circuits within assembly of modules 320, external to and coupled to the processor 330 or 310. As should be appreciated the level of integration of modules in the processor and/or with some modules being external to the processor may be one of design choice.

Alternatively, rather than being implemented as circuits, all or some of the modules may be implemented in software and stored in the memory 332 or 312 of the head mounted VR device 302, with the modules controlling operation of head mounted VR device 302 to implement the functions corresponding to the modules when the modules are executed by a processor, e.g., processor 330 or 310. In some such embodiments, the assembly of modules 600 is included in the memory 332 or 312 as assembly of modules 350 or 324. In still other embodiments, various modules in assembly of modules 600 are implemented as a combination of hardware and software, e.g., with another circuit external to the processor providing input to the processor 330 or 310 which then under software control operates to perform a portion of a module's function. While shown in the FIG. 3 embodiment as a single processor 330, e.g., computer, in removable communications/computational device 306 it should be appreciated that the processor 306 may be implemented as one or more processors, e.g., computers. While shown in the FIG. 3 embodiment as a single processor 310, e.g., computer, it should be appreciated that the processor 310 may be implemented as one or more processors, e.g., computers. In some embodiments, a single processor is used in place of processors 330 and 310.

When implemented in software the modules include code, which when executed by the processor 330 or 310, configure the processor 330 or 310 to implement the function corresponding to the module. In embodiments where the assembly of modules 400 is stored in the memory 332 or 312, the memory 332 or 312 is a computer program product comprising a computer readable medium comprising code, e.g., individual code for each module, for causing at least one computer, e.g., processor 330 or 310, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 6 control and/or configure the head mounted VR device 302 or elements therein such as the processor 330 or 310, to perform the functions of corresponding steps illustrated in the method of the flowchart of FIG. 5, and/or described with respect to any of the Figures. Thus the assembly of modules 600 includes various modules that perform functions of corresponding steps of one or more of FIG. 5.

Some embodiments are directed a non-transitory computer readable medium embodying a set of software instructions, e.g., computer executable instructions, for controlling a computer or other device to operate a VR device, e.g., a head mounted VR device which may be in a moving vehicle.

The techniques of various embodiments may be implemented using software, hardware and/or a combination of software and hardware. Various embodiments are directed to apparatus, e.g., a image data processing system. Various embodiments are also directed to methods, e.g., a method of processing image data. Various embodiments are also directed to a non-transitory machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

What is claimed is:

1. A virtual reality (VR) method comprising:
receiving inertial measurement unit (IMU) measurement information obtained from an inertial measurement unit (IMU) within a head mounted VR device;
processing the received inertial measurement unit information to filter out at least some detected motion attributable to motion of a vehicle to generate filtered information, said filtered information including at least one of: filtered orientation information or filtered motion information, wherein processing the received inertial measurement unit information to filter out at least some detected motion attributable to motion of the vehicle includes: filtering out detected motion consistent with motion of a vehicle which is not consistent with expected user directed motion of a user's head; and using the filtered information in controlling which portion of a simulated environment is displayed to a user at a given time.

2. The method of claim 1, wherein said filtering out detected motion consistent with motion of a vehicle is based on information about a type of vehicle in which the virtual reality device is located.

3. The method of claim 2, further comprising:
receiving information from a user indicating the type of vehicle in which the virtual reality device is located or automatically determining the type of vehicle in which the virtual reality device is located.

4. The method of claim 3, further comprising:
wherein said step of filtering out detected motion consistent with motion of a vehicle includes using a first filter if the type of vehicle is an airplane type and a second filter if the type of vehicle is an automobile type, said first filter type taking into consideration expected changes in head angle corresponding to a plane taking off or landing.

5. The method of claim 1, further comprising:
receiving at least one of vehicle orientation information or vehicle motion information obtained from a sensor device located in the vehicle external to the head mounted VR device.

6. The method of claim 5, wherein said sensor device is one of a sensor device built into the vehicle or a sensor device placed in the vehicle by a user of said head mounted VR device.

7. The method of claim 6, wherein filtering out detected motion consistent with motion of a vehicle which is not consistent with expected user directed motion of a user's head includes:
subtracting from motion detected by said IMU in the head mounted device at least some motion detected by said sensor.

8. The method of claim 1, further comprising:
capturing images using a camera included in said head mounted VR device;
determining if there is a change in the position of a reference point or reference object in the captured images.

9. The method of claim 8,
wherein processing the received inertial measurement unit information to filter out at least some detected motion attributable to motion of a vehicle to generate filtered information includes filtering out motion detected during a period of time in which there is no change in the position of the reference point or reference object in the captured images.

10. A head mounted virtual reality (VR) device comprising:
an inertial measurement unit (IMU);
a module configured to receive inertial measurement unit (IMU) measurement information obtained from the inertial measurement unit (IMU) within the head mounted VR device;
a module configured to process the received inertial measurement unit information to filter out at least some detected motion attributable to motion of a vehicle to generate filtered information, wherein said module configured to process the received inertial measurement unit information to filter out at least some detected motion attributable to motion of the vehicle includes:
a module configured to filter out detected motion consistent with motion of a vehicle which is not consistent with expected user directed motion of a user's head; and
a module configured to use the filtered information in controlling which portion of a simulated environment is displayed to a user at a given time.

11. The head mounted VR device of claim 10, wherein said filtering out detected motion consistent with motion of a vehicle is based on information about a type of vehicle in which the virtual reality device is located.

12. The head mounted VR device of claim 11, further comprising at least one of:
a module configured to receive information from a user indicating the type of vehicle in which the virtual reality device is located; or
a module configured automatically determine the type of vehicle in which the virtual reality device is located.

13. The head mounted VR device of claim 12,
wherein said module configured to filter out detected motion consistent with motion of a vehicle uses a first filter if the type of vehicle is an airplane type and a second filter if the type of vehicle is an automobile type, said first filter type taking into consideration expected changes in head angle corresponding to a plane taking off or landing.

14. The head mounted VR device of claim 10, further comprising:
a module configured to receive at least one of vehicle orientation or vehicle motion information obtained from a sensor device located in the vehicle external to the head mounted VR device.

15. The head mounted VR device of claim 14, wherein said sensor device is one of a sensor device built into the vehicle or a sensor device placed in the vehicle by a user of said head mounted VR device.

16. The head mounted VR device of claim 15, wherein said module configured to filter out detected motion consistent with motion of a vehicle which is not consistent with expected user directed motion of a user's head includes:
a module configured to subtract from motion detected by said IMU in the head mounted device at least some motion detected by said sensor device.

17. The head mounted virtual reality (VR) device of claim 10, further comprising:
a camera;
a module configured to control said camera included in said head mounted VR device to capture images;
stored information corresponding to one or more reference points or reference objects which may appear in captured images; and
a module configured to determine if there is a change in the position of a reference point or reference object in the captured images.

18. The head mounted VR device of claim 17, further comprising:
a module configured to filter out motion detected during a period of time in which there is no change in the position of the reference point or reference object in the captured images.

19. A non-transitory computer readable medium including computer executable instructions which, when executed by a computer of a virtual reality (VR) device including memory and a display, control the VR device to perform the steps of:
- receiving inertial measurement unit measurement information obtained from an inertial measurement unit of the VR device;
- processing the received inertial measurement unit information to filter out at least some detected motion attributable to motion of a vehicle to generate filtered information, said filtered information including at least one of: filtered orientation information or filtered motion information, wherein processing the received inertial measurement unit information to filter out at least some detected motion attributable to motion of the vehicle includes: filtering out detected motion consistent with motion of a vehicle which is not consistent with expected user directed motion of a user's head; and
- using the filtered information in controlling which portion of a simulated environment is displayed to a user at a given time.

* * * * *